United States Patent Office 3,579,578
Patented May 18, 1971

3,579,578
3,4-DIHALO-3' AND 4'-LOWER ALKYLCARBANILIDES
Edward J. Nikawitz, Glen Rock, and George R. Walter, Ho-Ho-Kus, N.J., assignors to Givaudan Corporation, Clifton, N.J.
No Drawing. Filed July 8, 1966, Ser. No. 563,673
Int. Cl. C07c *127/00*
U.S. Cl. 260—553      10 Claims

ABSTRACT OF THE DISCLOSURE

The present invention relates to novel 3,4-dihalo-3'- and 4'-lower alkyl carbanilides having bacteriostatic activity, a process for their manufacture, bacteriostatic compositions containing these compounds, synergistic basteriostatic compositions of the new compounds with hexachlorophene, and a method for controlling bacteria by the use of said compounds.

SUMMARY OF THE INVENTION

The new compounds may be represented by the general structural formula:

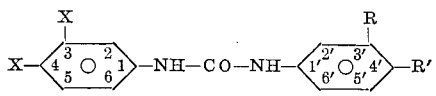

wherein X is halogen, preferably iodine, bromine or chlorine, the latter being especially preferred, and R and R' are selected from the group consisting of hydrogen and lower alkyl radicals having 2 to 5 carbon atoms, with the proviso that one of the radicals R and R' is hydrogen and the other one is one of said lower alkyl radicals.

The process for preparing the compounds of the present invention may be illustrated as follows:

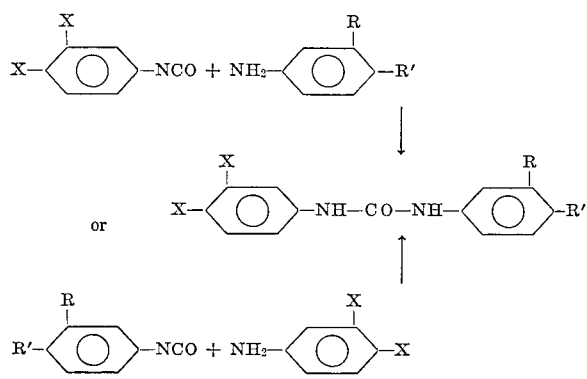

wherein X, R and R' have the same significance as in the foregoing general formula. It will be seen, therefore, that the new compounds can be prepared by either condensing a 3,4-dihalophenyl isocyanate with a 3- or 4-alkylaniline, or by condensing a 3- or 4-alkylphenyl isocyanate with a 3,4-dihaloaniline.

DETAILED DESCRIPTION

The general procedure of the above process for preparing the compounds of the present invention is to add one of the reactants, preferably but not necessarily in a solvent, to a rapidly agitated quantity of the other reactant, which is also preferably but not necessarily dissolved in a solvent. Stoichiometric amounts of the reactants are desirably employed although a moderate excess of either reactant may be used. Although as noted above, the reactants may be admixed directly, it is desirable to employ solutions of one and preferably both of the reactants, in order to moderate the initially exothermic reaction, to facilitate intimate contact of the reactants, and to accommodate the voluminous reaction product.

Any anhydrous solvent which is inert with respect to the isocyanates and substituted aniline compounds can be employed including, without limitation of other solvents not named, benzene, toluene, xylenes, petroleum ether, pentane, hexane, heptane, acetonitrile, ethyl ether, isopropyl ether, ethers in general, dioxane, tetrahydrofuran, halogenated hydrocarbons containing halogen inert to the aniline compounds under the selected reaction conditions, cycloaliphatic compounds, and others which will be apparent to those skilled in the art, as well as mixtures of such solvents.

Considerable latitude is permissible in the ratio of solvent to reactants, ranging from no solvent at all up to about 15 or more volumes of solvent per volume of reactants. Inasmuch as the carbanilide reaction products are rather insoluble in most of the suitable solvents listed above and the isolation procedures described below permit effective recovery of the desired products from large volumes of solvents, the upper limit of the permissible range of solvent proportions is rather flexible. While as noted above no solvent at all may be employed, it has been found to be highly desirable to employ at least about 5 volumes of solvent per volume of reactants, since the voluminous reaction products tend to hinder agitation at lower solvent levels and thus inhibit the reaction by reducing contact between the reactants.

The reaction temperature may range from less than 0° C. up to the reflux temperature of the solvent employed. This is due to the fact that the isocyanates are very reactive compounds and the reaction will proceed below room temperature and even down to 0° C. or less. Due to the vigor of the reaction it is preferred to start the reaction at room temperature and to maintain this temperature by external cooling or to permit a moderate spontaneous rise in the reaction temperature due to its exothermic nature. Consistent with keeping the reaction under control, external heat may be applied up to the reflux temperature of the solvent. Indeed, the application of external heat may be used to determine visually completion of the reaction since if complete, the application of heat will, of course, fail to accelerate or promote the reaction.

The time required for completion of the reaction depends upon the reaction temperature as would be expected. At low temperatures such as 0° C. the reaction proceeds much more slowly than at elevated temperatures such as 100° C. or the reflux temperature of the solvent. Inasmuch as a great variety of solvents of widely varying boiling points may be used, as noted above, the reaction time may vary widely. It is preferred, however, to select a solvent, reaction temperature or other conditions such that the reaction may come to completion within from about one hour to about 20 hours, and preferably within a few hours' time.

Completion of the reaction may, of course, be determined by testing for the presence of the reactants in the reaction mixture by conventional procedures.

Isolation of the desired reaction products may be achieved in a variety of ways. If the reaction products are deposited as solids in the reaction mixture, they may be separated by filtration, washed with a suitable solvent, such as one of those listed above, which is a solvent for the reaction solvent and any unreacted reactants. The product can then be recrystallized from a suitable solvent therefor, according to conventional techniques. Alternatively the reaction solvent may be removed from the reaction mixture by steam distillation and the separated crude product worked up by washing and recrystallization as before. Still another means of purification consists of agitation of the isolated reaction products with a solvent or solvents in which only the reactants are substantially soluble, thus, removing unreacted reactants. Traces of unreacted substituted aniline reactants can, for example, be removed from the reaction product by agitation with dilute acids.

If the reaction products are substantially soluble in the reaction solvents, which might be the case with certain of the solvents listed above, particularly when used at a high solvent to reactant ratio, the desired product can be isolated by concentration of the reaction mixture by distillation, or complete removal of the solvents may be achieved by distillation or steam distillation. In many cases the product can also be isolated from the reaction mixture by freezing according to known techniques. If desired, the isolated products can be purified by the methods described above.

In order to illustrate the preparation of the new compounds of the invention, the following examples are given. The parts and percentages are by weight.

EXAMPLE 1

3,4-dichloro-4'-propylcarbanilide p-Propylaniline (2.7 g.; purity by V.P.C.: 95%) and 20 ml. of ethyl ether were charged into a 250 ml. flask fitted with a sealed stirrer, a dropping funnel and a reflux condenser. A solution of 3.7 g. of 3,4-dichlorophenyl isocyanate in 50 ml. of ethyl ether was added to the agitated p-propylaniline-ether solution over a period of 30 minutes. Agitation was continued for 15 hours. The resulting white solid was filtered, washed with ethyl ether (20 ml.) and recrystallized from 65 ml. of S.D. alcohol #30. After standing for 15 hours at about −10° C. the solid was filtered, washed with 10 ml. of ice-cold S.D. alcohol #30 and dried at a pressure of 4 mm. at 50° C. Yield: 4.3 g.; M.P. 180–182° C.; color: white. Bacteriostatic values: column 2: 0.625; column 4: 0.312. References to numbered columns in connection with bateriostatic values given in the examples herein are to the description of a standard test procedure and a table of minimum bacteriostatic concentrations appearing hereinafter.

EXAMPLE 2

3,4-dichloro-4'-ethylcarbanilide

The procedure of Example 1 was repeated starting with 6.1 g. p-ethylaniline and 9.4 g. 3,4-dichlorophenyl isocyanate, substituting p-ethylaniline for the p-propylaniline, to obtain the desired product. Yield: 11.2 g.; M.P. 205–6° C.; and an additional 2.4 g. from the mother liquor, M.P. 204–5° C.; Bacteriostatic values: column 2: >20; column 3: 20; column 4: 2.5.

EXAMPLE 3

3,4-dichloro-4'-isopropylcarbanilide p-Cumidine (5.4 g. containing about 90% of para and 5% each of m and o) was charged into a 250 ml. flask fitted with a sealed stirrer, a reflux condenser and a dropping funnel. Ethyl ether anhydrous (30 ml.) was added. The solution was agitated rapidly.

Freshly distilled 3,4-dichlorophenyl isocyanate (7.5 g.) was dissolved in 30 ml. of ethyl ether anhydrous. This solution was added to the cumidine solution over a period of 15 minutes. The mixture started to reflux and a heavy white precipitate formed. Ethyl ether anhydrous (25 ml.) was added to facilitate agitation and the whole was agitated for 15 hours. The precipitate was filtered and washed with 20 ml. of ethyl ether anhydrous. It was recrystallized from 105 ml. of S.D. alcohol #30. After standing in the freezer for 15 hours, the white solid was filtered, washed with 20 ml. of ice-cold S.D. alcohol #30 and dried on the steam bath. Yield: 9 g.; M.P. 176–178° C. Bacteriostatic values: column 2: 0.156; column 4: 0.156.

Analysis.—Calcd. for $C_{16}H_{16}Cl_2N_2O$ (percent): C, 59.45; H, 4.99; Cl, 21.94. Found (percent): C, 59.82; H, 5.36; Cl, 21.96.

EXAMPLE 4

3,4-dichloro-4'-isopropylcarbanilide (pure)

p-Cumidine (81 g.; purity by V.P.C.: 100%) and 600 ml. of dry toluene were charged into a 2 l. flask fitted with a sealed stirrer, a dropping funnel, a thermometer and a reflux condenser. Freshly distilled 3,4-dichlorophenyl isocyanate (113 g.) dissolved in 100 ml. of dry toluene was added to the rapidly agitated p-cumidine toluene solution over a period of 45 minutes. After the first 20 minutes, the temperature had risen from 23° C. to 42° C. A heavy, white precipitate had formed; toluene (90 ml.) was added to facilitate agitation. The final temperature was 55° C. Toluene (100 ml.) was added and the batch was agitated an additional 3 hours at 40° C. Then the temperature was raised slowly to 90° C. This temperature was maintained for 2 hours. After standing overnight at room temperature, the agitated batch was cooled one hour in ice. The solid was filtered, washed with 100 ml. and 50 ml. of ice-cold toluene and dried at 80° C. at a pressure of 4 mm. Yield: 187 g.; M.P.: 175–178° C., glassy melt.

Analysis.—Calcd. for $C_{16}H_{16}Cl_2N_2O$ (percent): C, 59.45; H, 4.99; Cl, 21.94. Found (percent): C, 59.92; H, 5.12; Cl, 21.59.

Ten grams of the compound were recrystallized from 110 ml. of S.D. alcohol #30. After standing for 15 hours at −10° C. the solid was filtered, washed twice with 15 ml. of ice-cold alcohol and dried at 80° C. at a pressure of 5 mm. Yield: 8.6 g. The compound apparently has two melting points. Occasionally a M.P. of 176–178° C. (clear melt) was observed; usually the compound formed a glassy melt at 176–178° C. which became clear at 182–183° C.; a M.P. of 183–184° C. has also been obtained.

Analysis.—Calcd. for $C_{16}H_{16}Cl_2N_2O$ (percent): C, 59.45; H, 4.99; Cl, 21.94. Found (percent): C, 59.46; H, 4.92; Cl, 21.90.

Bacteriostatic values: column 2: 0.312; column 4: 0.156.

EXAMPLE 5

3,4-dichloro-4'-isopropylcarbanilide technical

Cumidine Tech. (9.5 g., approximate composition by V.P.C. 83% p, 5% m, 12% o) and 100 ml. of hexane were charged into a 250 ml. flask fitted with a sealed stirrer, a thermometer, a dropping funnel and a reflux condenser. 3,4-dichlorophenyl isocyanate (13 g.) dissolved in 60 ml. of hexane was added to the rapidly agitated cumidine-hexane solution over a period of 30 minutes. A white precipitate formed; the temperature rose to 45° C. Agitation was continued at room temperature for an additional hour. The batch was then refluxed one hour and allowed to stand at room temperature overnight. The white solid was filtered, washed twice with 40 ml. of hexane and dried on the steam bath. Yield: 21.5 g.; M.P. 161–167° C.; started to sinter at about 125° C.; color: white. Bacteriostatic values: column 2: 0.156; column 4: 0.156.

The same results were obtained when the starting cumidine contained 75% p-cumidine.

EXAMPLE 6

3,4-dichloro-3'-isopropylcarbanilide m-Cumidine (2.7 g., purity by V.P.C. 100%) and 30 ml. of heptane were charged into a 250 ml. flask fitted with a sealed stirrer, a thermometer, a dropping funnel and a reflux condenser. 3,4-dichlorophenyl isocyanate (3.7 g.) dissolved in 20 ml. of heptane was added to the rapidly agitated cumidine-heptane solution over a period of 30 minutes. Agitation was continued for an additional 2 hours. After standing overnight, the white solid was filtered, washed with 10 ml. of heptane and dried on the steam bath. Yield: 6 g.

It was recrystallized from 50 ml. of toluene and allowed to crystallize overnight at −10° C. Yield: 5.7 g.; M.P.: 176–176.5° C.; color: white.

Analysis.—Calcd. for $C_{16}H_{16}Cl_2N_2O$ (percent): Cl, 21.94. Found: Cl, 21.86.

Bacteriostatic values: column 2: 0.312; column 4: 0.078.

EXAMPLE 7

3,4-dichloro-4'-n-butylcarbanilide p-Butylaniline (6 g.) and 3,4-dichlorophenyl isocyanate (7.5 g.) were brought to reaction in the presence of 80 ml. of ethyl ether according to the procedure of Example 2. The yield of crude material was 12.7 g.; M.P. 174–175° C. Five grams were recrystallized from 110 ml. of S.D. alcohol #30. Yield: 4.1 g.; M.P.: 178–179° C.; color: white.

Analysis.—Calcd. for $C_{17}H_{18}Cl_2N_2O$ (percent): C, 60.54; H, 5.38; Cl, 21.02. Found (percent): C, 60.21; H, 5.76; Cl, 21.00.

Bacteriostatic values: column 2: 1.25; column 3: 1.25; column 4: 2.5.

EXAMPLE 8

3,4-dichloro-4'-sec.-butylcarbanilide

Sec. butylaniline (6 g., containing 80% of the p-isomer), 60 ml. of ethyl ether and 3,4-dichlorophenyl isocyanate (7.5 g.) were charged into a 250 ml. flask fitted with a sealed stirrer and a reflux condenser. The solution was agitated overnight. Then, the ether was distilled. The residual solid was recrystallized from a mixture of 50 ml. of hexane and 25 ml. of toluene. After standing overnight at −10° C. the solid was filtered, washed with 10 ml. of the ice-cold pure crystallization liquid and dried. Yield: 6.3 g.; M.P.: 130–131° C.; color: white.

Analysis.—Calcd. for $C_{17}H_{18}Cl_2N_2O$ (percent): C, 60.54; H, 5.38. Found (percent): C, 60.60; H, 5.53.

Bacteriostatic values: column 2: 0.156; column 4: 0.156.

EXAMPLE 9

3,4-dichloro-4'-tert.-butylcarbanilide(pure)

p-Tert.-butylaniline (6 g.) and 80 ml. of toluene were charged into a 250 ml. flask fitted with a sealed stirrer, a thermometer, a dropping funnel and a reflux condenser. 3,4-dichlorophenyl isocyanate (7.5 g.) dissolved in 30 ml. of toluene was added over a period of 30 minutes. Agitation at room temperature was continued for one hour and then for an additional hour at 75° C. After standing overnight at room temperature, the agitated batch was cooled one hour in ice. The white solid was filtered and washed with 10 ml. of ice-cold toluene. It was dried in a dish. Yield: 13 g.; M.P.: 203–204° C. Recrystallized from 75 ml. of absolute S.D. alcohol #30. Allowed to stand at −10° C. for 15 hours. The recrystallized product was filtered, washed with 10 ml. of ice-cold alcohol and dried at 4 mm. at 50° C. Yield: 9.9 g.; M.P.: 205–206° C.; color: white.

Analysis.—Calcd. for $C_{17}H_{18}Cl_2N_2O$ (percent): C, 21.02. Found (percent): C, 21.14.

Bacteriostatic values: column 2: 0.312; column 4: 0.156.

EXAMPLE 10

3,4-dichloro-4'-tert.-butylcarbanilide(technical)

Tech. tert.-butylaniline (6 g., containing about 80% of the p-isomer and about 20% of the o-isomer) was brought to reaction with 3,4-dichlorophenyl isocyanate (7.5 g.) in ethyl ether (80 ml.) according to methods described previously. The yield of the crude, white product was 10.5 g.; M.P.: 183–188° C.

Analysis.—Calcd. for $C_{17}H_{18}Cl_2N_2O$ (percent): Cl, 21.02. Found (percent): Cl, 21.06.

Bacteriostatic values: column 2: 0.312; column 4: 0.3121.

EXAMPLE 11

3,4-dichloro-4'-isobutylcarbanilide p-Isobutylaniline (6 g., 100% purity by V.P.C.), 60 ml. of ethyl ether and 3,4-dichlorophenyl isocyanate (7.5 g.) were charged into a 250 ml. flask fitted with a sealed stirrer and a reflux condenser. After agitation for 15 hours, the resulting solid was filtered and recrystallized from 150 ml. of toluene. Yield: 10.9 g.; M.P.: 168–169° C.; color: white.

Analysis.—Calcd. for $C_{17}H_{18}Cl_2N_2O$ (percent): C, 60.54; H, 5.38. Found (percent): C, 60.89; H, 5.60.

Bacteriostatic values: column 2: 10; column 3: 5; column 4: 2.5.

EXAMPLE 12

3,4-dichloro-4'-tert.-amylcarbanilide p-Tert.-amylaniline (6.5 g., purity 100% by V.P.C.) and 50 ml. of toluene were charged into a 250 ml. flask fitted with a sealed stirrer, a thermometer, a dropping funnel and a reflux condenser. A solution of 3,4-dichlorophenyl isocyanate (7.5 g.) in 20 ml. of toluene was added to the agitated solution over a period of 30 minutes. The batch was then agitated 2 hours at room temperature and 2 hours at 90° C. After standing overnight, the resulting solution was agitated one hour at 0° C. The formed precipitate was filtered, washed with 25 ml. of ice-cold toluene and dried. Yield: 12.3 g.; M.P.: 174–176° C. It was recrystallized from 75 ml. of ethylene dichloride. Yield: 11.2 g.; M.P.: 211–212° C.

Analysis.—Calcd. for $C_{18}H_{20}Cl_2N_2O$ (percent): C, 61.54; H, 5.74; Cl, 20.19. Found (percent): C, 61.95; H, 5.68; Cl, 20.09.

Bacteriostatic values: column 2: 0.625; column 4: 2.5.

EXAMPLE 13

3,4-dichloro-4'-(mixed pentyl)-carbanilide p-Mixed-pentylaniline (3.3 g., containing 50% 1-methylbutyl isomer; remainder being other pentyl isomers), 60 ml. of heptane and 3,4-dichlorophenyl isocyanate (3.7 g.) were agitated overnight in a 250 ml. flask fitted with a sealed stirrer and a reflux condenser. The resulting precipitate was filtered, washed with a little cold heptane and dried. Yield: 5 g. It was recrystallized from a mixture of 50 ml. of hexane and 14 ml. of toluene. Yield: 2.8 g.; M.P.: 139–143° C.; color: white.

*Analysis.*—Calcd. for $C_{18}H_{20}Cl_2N_2O$ (percent): Cl, 20.19. Found (percent): Cl, 20.38.

Bacteriostatic values: column 2: 0.625; column 4: 0.625.

EXAMPLE 14

3,4-dichloro-4'-isopropylcarbanilide

As noted above the halogen substituents of the desired product may also be derived from the aniline reactant and the alkyl substituent may be derived from the isocyanate reactant as compared to the vice versa derivation of these substituents in the foregoing examples. p-Isopropylphenyl isocyanate for this purpose was prepared as follows: Phosgene (110 g.) was introduced at 5° C. into 500 ml. of dry toluene being agitated in a 1 l. flask fitted with a sealed stirrer, a reflux condenser, a thermometer and a dropping funnel. The top of the condenser was connected to a scrubber containing 25% caustic soda. p-Cumidine (27 g.) dissolved in 75 ml. of toluene was then added to the dissolved phosgene solution at about 40–50° C. over a period of 20 minutes. The batch was then heated slowly to reflux and refluxed an additional 4 hours. The toluene was distilled at about 300 mm. pressure. The residual oil was distilled at 3 mm.

| | B.P. | Yield, grams | $n_D^{20}$ |
|---|---|---|---|
| Fraction: | | | |
| 1 | 66–69 | 1 | |
| 2 | 69–71 | 24 | 1.5199 pure p-isopropylphenyl isocyanate. |
| 3 | 71 | 2 | |

3,4-dichloroaniline (3.2 g.), p-isopropylphenyl isocyanate (3.2 g.) and 60 ml. of heptane were agitated and refluxed in a suitable vessel for 2 hours. After standing overnight, the resulting solid was filtered and recrystallized from 100 ml. of S.D. alcohol #30. Yield: 5.5 g.; M.P.: 176–178° C., glassy melt. This same general procedure can be employed to produce any of the products of Examples 1–13 above or any of the compounds of the invention by substitution of the correspondingly substituted reactants.

EXAMPLE 15

3,4-dichloro-4'-methylcarbanilide

The purpose of this and the following examples is to delineate the invention by showing that the compounds corresponding to those of the invention but having one fewer and one more carbon atom in the alkyl group do not have the bacteriostatic activity characteristic of the compounds of the invention.

p-Toluidine (4.3 g.), 100 ml. of ethyl ether and 3,4-dichlorophenyl isocyanate (7.5 g.) were agitated for 2 hours in a 250 ml. flask fitted with a sealed stirrer and a reflux condenser. The resulting white precipitate was filtered, washed with 10 ml. of ethyl ether and dried. It was recrystallized from a mixture of 300 ml. of absolute S.D. alcohol #30 and 25 ml. of dimethylformamide. Yield: 8 g.; M.P.: 258–260° C.; color: white. Bacteriostatic values: column 2: >20; column 4: 10. This product is not sufficiently active to be of practical use as a bacteriostat.

EXAMPLE 16

3,4-dichloro-4'-hexylcarbanilide was prepared starting with 7.1 g. of p-hexylaniline and 7.5 g. of 3,4-dichlorophenyl isocyanate, according to the procedure of Example 1 above, to obtain the desired product. Yield: 10.2 g.; M.P.: 149° C. Bacteriostatic values: column 2: >20; column 4: 10. This product is not sufficiently active to be of practical use as a bacteriostat.

All solvents employed in the above examples were dried by conventional procedures prior to use.

All of the new compounds of the present invention are insoluble in water but are readily soluble in acetone and dimethylformamide. It is, of course, important for some applications of the new compounds as bacteriostats that they be soluble in various solvents. In general the new compounds are more soluble in useful solvents than the trichlorocarbanilide of the prior art and thus are more useful bacteriostats. The solubility of the new compounds in representative useful solvents is set out in the table below.

SOLUBILITY

[3,4-dichloro-3'- and 4'-lower alkylcarbanilides as compared to that of trichlorocarbanilide (3,4,4') expressed in grams per 100 ml. of solvent at 25° C.]

| Carbanilide | Ethanol (95%) | Isopropanol | Isopropyl myristate | 40% coconut oil soap |
|---|---|---|---|---|
| Trichlorocarbanilide | 0.75 | 1.0 | 0.22 | 0.03 |
| 3,4-dichloro-4'-ethylcarbanilide | 1.07 | 2.07 | 0.38 | 0.01 |
| 3,4-dichloro-4'-n-propylcarbanilide | 2.92 | 3.48 | 0.706 | 0.062 |
| 3,4-dichloro-4'-isopropyl carbanilide | 1.25 | 2.76 | 0.875 | 0.085 |
| 3,4-dichloro-3'-isopropylcarbanilide | 2.89 | 5.00 | 0.29 | 0.037 |
| 3,4-dichloro-4'-n-butylcarbanilide | 1.08 | 0.81 | 0.378 | 0.017 |
| 3,4-dichloro-4'-sec.-butylcarbanilide | 6.5 | 9.2 | 5.0 | 0.29 |
| 3,4-dichloro-4'-tert.-butylcarbanilide | 4.47 | 1.18 | 0.3 | 0.037 |
| 3,4-dichloro-4'-isobutylcarbanilide | 1.67 | 1.50 | 0.75 | 0.2 |
| 3,4-dichloro-4'-tert.-amylcarbanilide | 5.76 | 7.17 | 2.2 | 0.22 |
| 3,4-dichloro-4'(mixed) pentylcarbanilide | 12.5 | 26.1 | 3.79 | 0.071 |

In order to show the unexpected bacteriostatic activity of the 3,4-dihalo-3'- and 4'-lower alkylcarbanilides of the present invention having 2 to 5 carbon atoms in the lower alkyl group, these compounds and closely related compounds were tested for bacteriostatic activity and the results compared. The in vitro soap bacteriostat tests were conducted as follows: A compound is dissolved in a suitable solvent usually alcohol (S.D. 30), acetone or dimethyl formamide to give a 6% solution. One-half ml. aliquot added to 100 ml. of 3% solution of bar soap stock solution. The solid soap used was a neutral white toilet soap of the "Lux" type. The fatty acids in this soap were of the following composition:

| | Percent, about |
|---|---|
| Aleic and linoleic acids | 45 |
| Palmitic acid | 30 |
| Stearic acid | 10 |
| Lower fatty acids (lauric, etc.) | 15 |

This yields an aqueous soap solution containing 30,000 mcg./ml. soap and 300 mcg./ml. compound. The soap/compound ratio in the latter is 100/1. A two-fold serial dilution series is prepared with this solution using sterile distilled water in test tubes such that the final volume in each tube is 2.0 ml. To each test tube, is added 28 ml. molten Dextrose Trypticase Extract Agar (B.B.L.), the tube contents poured into sterile petri plates and allowed to harden. The highest final concentration of compound in the series dilution series is 20 mcg./ml. Plates are spot innoculated with a broth culture of *Staphylococcus aureus* and incubated at 35° C. for 48 hours. The lowest concentration completely inhibiting growth of the test organism, in mcg./ml., is recorded as the bacteriostatic concentration of the compound. Tests in the absence of soap are made in a similar manner except that all dilutions are made in solvent. The final solvent concentration in the agar should not be greater than 5%.

The results of these tests are set forth in the table below: Column 2 contains the data as to the activity of the test solutions without soap. Column 3 refers to tests in which the ratio of soap to compound was 50:1; column 4 indicates a ratio of soap to compound of 100:1. The figures in the table indicate the minimum bacteriostatic concentration expressed in mcg./ml.

BACTERIOSTATIC ACTIVITY

[3,4-dichloro-3'- and 4'-lower (2-5 carbon atoms) alkylcarbanilides as compared to that of other similar carbanilides]

| 1 | 2 | 3 | 4 |
|---|---|---|---|
|  | Water | Soap solution 50:1 | Soap solution 100:1 |
| 3,4-dichloro carbanilide: |  |  |  |
| 3,4-dichloro-4'-ethylcarbanilide | >20 | 20 | 2.5 |
| 3,4-dichloro-4'-n-propylcarbanilide | 0.625 |  | 0.312 |
| 3,4-dichloro-4'-isopropylcarbanilide | 0.156 |  | 0.156 |
| 3,4-dichloro-3'-isopropylcarbanilide | 0.312 |  | 0.078 |
| 3,4-dichloro-4'-n-butylcarbanilide | 1.25 | 1.25 | 2.5 |
| 3,4-dichloro-4'-sec.-butylcarbanilide | 0.156 |  | 0.156 |
| 3,4-dichloro-4'-tert.-butylcarbanilide | 0.312 | 0.312 | 0.312 |
| 3,4-dichloro-4'-isobutylcarbanilide | 10 | 5 | 2.5 |
| 3,4-dichloro-4'-tert.-amylcarbanilide | 0.625 |  | 2.5 |
| 3,4-dichloro-4'-(mixed) pentylcarbanilide | 0.625 |  | 0.625 |
| Other carbanilides: |  |  |  |
| 3,4-dichloro-4'-hexylcarbanilide | >20 |  | 10 |
| 3,4-dichloro-2'-propylcarbanilide | >20 |  | 10 |
| 4-chloro-4'-propylcarbanilide | >20 |  | 10 |
| 3-chloro-4'-propylcarbanilide | >20 |  | 10 |
| 3-chloro-2'-propylcarbanilide | >20 |  | 10 |
| 3,4-dichloro-2'-isopropylcarbanilide | >20 |  | 20 |
| 4-chloro-2'-isopropylcarbanilide | >20 |  | 10 |
| 4-isopropyl-3'-(trifluoromethyl)carbanilide | >20 |  | 10 |
| 3-chloro-4'-isopropylcarbanilide | >20 |  | 10 |
| 3,4-dichloro-4'-methylcarbanilide | >20 | 20 | 10 |
| 3,4-dichloro-3'-(2-hydroxyethyl)carbanilide | >20 | 20 | 10 |
| 1-(3,4-dichlorophenyl)-3-isobutyl-3-phenylurea | >20 |  | 20 |

In interpreting the data in the above table, it should be remembered that any compound showing a value of about 5 or greater under the above test conditions is not sufficiently active to be useful as a practical bacteriostat. In this connection it should be noted that while the 3,4-dichloro-4'-ethylcarbanilide does not give satisfactory results in vitro under the conditions of columns 2 and 3, it affords excellent antibacterial activity under the conditions of column 4 and is, therefore, useful as a bacteriostat. The 3,4-dichloro-4'-methyl- and hexylcarbanilides, however, do not have a useful degree of bacteriostatic activity under any of the test conditions and are, therefore, worthless as practical bacteriostatic materials. The corresponding dihalo compounds containing halogens other than chlorine, and particularly bromine and iodine, have similar solubility and bacteriostatic activity to those of the chlorides given above.

The 3,4-dihalo-3- or 4'-lower alkylcarbanilides of the present invention are obtained by the method described above in the form of powders, generally white in color, which can be used as such as bacteriostats or may be incorporated in any suitable carrier inert to the active compounds to provide a wide variety of bacteriostatic compositions.

Among the bacteriostatic compositions afforded by the present invention are those in which new bacteriostatic agents in the form of the dry powders are blended with dry powdered carriers such as starch, talcum or other dusting powders with or without other medicaments for direct application to human skin of the body, face or feet. The bacteriostatic compounds may also be incorporated in pressed solid carriers for such purposes. Other bacteriostatic cosmetic preparations may be made by dissolving the compounds in a suitable solvent such as isopropyl myristate or ethyl or isopropyl alcohol or mixtures of these solvents for incorporation in stick, paste, jelly, cream, lotion, roll-on, spray aerosol or other liquid compositions useful for controlling bacteria on the skin. Still further, solutions of the new bacteriostatic compounds may be prepared which are suitable for cleaning medical instruments, food processing equipment, or any other surface upon which it is desired to control bacteria by the method of the invention. The compounds of the invention can also be finely milled and incorporated into ointments by conventional techniques to render them antibacterial.

As is well known many of the available bacteriostatic agents, notably those of the quaternary ammonium salt type, are inactivated in the presence of capillary active or surface active agents such as soaps and detergents. The bacteriostatic activity of the agents of the present invention, however, as a general rule, is not substantially reduced by a wide variety of surface active substances, and in some cases is even improved. For this reason the new agents are especially useful in combination with such capillary active materials.

As is well-known in the art a wide variety of materials are useful for many purposes due to these capillary or surface active properties. More specifically such materials include soaps, i.e. alkali metal salts of fatty acids; salts of sulfated alcohols such as sodium lauryl sulfate, for example; salts of sulfated and sulfonated alkyl acid amides ("Igepon T"); salts of alkylaryl sulfonates, e.g. sodium dodecylbenzene sulfonate; alkylnaphthalenesulfonic acids and their salts ("Nekal"); salts of sulfonated alkylaryl polyether alcohols (Tritons 720, etc.); and many other products, detergents and emulsifiers known to the art whether of the anionic, cationic, nonionic or amphoteric types of surface active agents. A more complete description of many of the materials included in the class of capillary active and surface active agents referred to above may be found in Encyclopedia of Surface-Active Agents, I. P. Sisley, Chemical Publishing Co., Inc., New York, N.Y.; and Surface Active Agents, A. M. Schwartz and I. W. Perry, Interscience Publishers, Inc., New York, N.Y.

As will be explained more fully below, it has also been found that the new compounds exhibit synergistic antibacterial activity in the presence of hexachlorophene, 2,2'-methylenebis(3,4,6-trichlorophenol), in any of the compositions suggested above.

Relatively small amounts of the new bacteriostatic compounds may be used in the antibacterial compositions described above, including soaps, and other surface active or detergent compositions, which may be considered to be typical as to concentration levels. Amounts as low as 0.1% to 1%, based upon the total weight of the composition, soap or detergent may be employed although a range of about 1 to 3% is usually preferred. Amounts less than about 0.1% are generally of little value since they generally do not produce a useful degree of activity. Although 5% or more may be used, the upper limit of the amount of agent which may be used is determined by practical considerations. As a general rule, increasing the concentration of agent in the soap increases the germicidal activity of the resulting soap. However, the cost of the agent relative to the cost of the soap itself mitigates against the use of too large an amount of the agent in soap. Moreover, large amounts of the agent in soap are to be avoided since it is desired to obtain a resulting soap product with satisfactory detergent properties.

The invention may be practiced by adding the agents to the soap in any suitable manner during the crutching or milling or similar operation. Care should be taken to obtain a uniform distribution of the agents throughout the soap. They may be dissolved in a small amount of a suitable solvent, for example, alcohol or acetone. If desired, however, the agents may be added directly to the soap without dissolving them previously. In the case of "frame" soaps, we prefer to add the agents to the soap during the crutching operation. With milled soaps, we prefer to effect the addition while the agent is in solution. In general, any method which results in the agent being uniformly incorporated into the final soap product is satisfactory.

The new bacteriostatic compound, as noted above, can be incorporated in similar concentrations in cosmetic formulations and detergent compositions other than soaps according to known techniques fully familiar to those skilled in the art.

A similar range of total concentration of bacteriostats can also be employed for mixtures of the new compounds with other bacteriostats or for the syneragistic mixtures of these materials with hexachlorophene. The ratio of new carbanilide bacteriostat to known bis-phenol bacteriostat in the synergistic mixtures ranges from about 9 to 1 to about 1 to 9, and preferably is about 2 to 1 to 1 to 2 parts by weight.

Typical formulations containing the new bacteriostats are set forth in the following specific examples.

EXAMPLE 17

Two parts of finely ground 3,4-dichloro-4'-isopropylcarbanilide or 2 parts of 3,4-dichloro-4'-sec.-butyl-carbanilide are blended well with 98 parts of soda soap filings. The blend is then milled thoroughly and pressed into molds. The soda soap may be of the "Lux" type described above or any other suitable bar soap stock.

EXAMPLE 18

One part of finely ground 3,4-dichloro-4'-isopropylcarbanilide or one part of finely ground 3,4-dichloro-4'-tert.-butylcarbanilide are carefully blended with one part of hexachlorophene and one part of sodium dodecylbenzenesulfonate. This mixture is intimately milled with 97 parts of soda soap filings as above and pressed into molds.

EXAMPLE 19

Hexachlorophene 0.5 part and 3,4-dichloro-4'-isopropylcarbanilide 0.5 part are dissolved in a mixture of 80 parts of alcohol or isopropanol and 19 parts of isopropyl myristate by warming; the resulting solution can be used as an antibacterial lotion or in an antibacterial aerosol product formulated according to known techniques.

The soap compositions, lotion and aerosol spray products of Examples 17, 18 and 19 above are typical of a wide variety of cosmetic products which can be formulated according to known techniques for controlling bacteria on the skin and are effective for this purpose when tested according to the techniques known to the art for prior germicidal soaps, for example, as described in Kunz et al. U.S. Pat. 2,535,077.

The antibacterial synergism with the known hexachlorophene, which is exhibited by all of the compounds of the invention is illustrated by the following demonstration with a typical compound, 3,4-dichloro-4'-isopropylcarbanilide.

In vitro demonstration of synergism between 3,4-dichloro-4'-isopropylcarbanilide and 2,2'-methylenebis-(3,4,6-trichlorophenol).

The attached figure presents the results of two trials, the results of which exhibit a synergistic relationship between 3,4-dichloro-4'-isopropylcarbanilide, (D) and 2,2'-methylenebis-(3,4,6-trichlorophenol), (G). The coordinate points represent sample preparations containing the concentrations of active ingredients (mcg./ml.) indicated on the ordinate and abscissa respectively. The soap concentration of each sample preparation was 100 fold greater than the total combined concentration of the two active ingredients. Thus, the ultimate bacteriostatic dilution of a soap bar containing 1% w./w. of any of the combination may be calculated from the data obtained.

The solid line indicates an additive response for complete inhibition contributed by each active ingredient. The dotted line represents an additive line which does not completely inhibit growth of the test organism (S. aureus). Any response on the dotted line or to the left of this line demonstrating complete inhibition is regarded as a response greater than additivity or synergism. For example, in trial II, it required 0.18 mcg./ml. D and 0.54 mcg./ml. G for complete inhibition. (0.18D≃0.54G or D=3G) in terms of relative acivity. The coordinate point located by 0.06D and 0.08G demonstrated complete inhibition. In terms of the relative activity of this sample preparation (D=3G and .06D=.18G) or 0.18G+0.08G=0.26G. That is, in terms of G activity which requires 0.54 mcg./ml. to inhibit singularly, the coordinate points represents 0.26G or an enhancement of about two fold.

The test itself is a conventional agar dilution type of test in which each agar plate ultimately contains the designated concentrations of actives and soap. The agar employed was Trypticase Glucose Extract Agar (BBL) and plates were spot inoculated with an undiluted 24 hr. A.O.A.C. broth culture of S. aureus. Plates were incubated at 35° C. for 48 hours and the response recorded as (+) growth, (±) partial inhibition or (−) complete inhibition.

The data presented indicate that the synergistic relationship holds for carbanilide/bis-phenol ratios in the range of about 2 to 1 through about 1 to 8. Cost-activity relationships, of course, govern the preferred commercial ratio which presently is believed to be about 1 to 1.

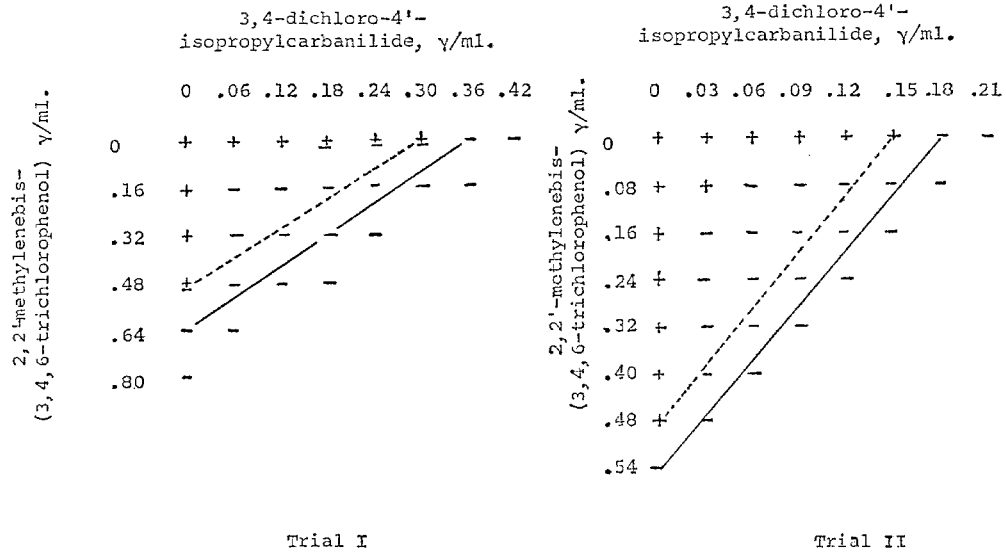

It should be noted that although the compounds of the present invention can be prepared in pure form, it is not always necessary to purify them prior to use, and indeed, technical mixtures such as those prepared in Examples 5 and 10 above may be used as such in many practical commercial applications since such mixtures possess a useful degree of antibacterial activity, even though they contain substantial amounts of the inactive ortho isomers together with the active meta-para isomers of the present invention.

The foregoing illustrates the practice of our invention which, however, is not to be limited thereby but is to be construed as broadly as permissible in view of the prior art and limited solely by the appended claims.

What is claimed is:
1. A compound selected from the group consisting of 3,4-dichloro - 3' - isopropyl-carbanilide, 3,4-dichloro-4'-n-propyl-carbanilide, 3,4-dichloro-4'-isopropyl-carbanilide, 3,4-dichloro-4'-n-butyl-carbanilide, 3,4-dichloro - 4'- sec.-butylcarbanilide, 3,4-dichloro - 4' - tert.-butylcarbanilide, 3,4-dichloro-4'-isobutyl-carbanilide, 3,4 - dichloro-4'-tert.-amylcarbanilide and 3,4-dichloro-4'-(mixed)-pentylcarbanilide.
2. A compound of claim 1: 3,4-dichloro-3'-isopropyl-carbanilide.
3. A compound of claim 1: 3,4-dichloro-4-n-propyl-carbanilide.
4. A compound of claim 1: 3,4-dichloro-4'-isopropyl-carbanilide.
5. A compound of claim 1: 3,4-dichloro-4'-n-butyl-carbanilide.
6. A compound of claim 1: 3,4-dichloro-4'-sec.-butyl-carbanilide.
7. A compound of claim 1: 3,4-dichloro-4'-tert.-butyl-carbanilide.
8. A compound of claim 1: 3,4-dichloro-4'-isobutyl-carbanilide.
9. A compound of claim 1: 3,4-dichloro-4'-tert.-amyl-carbanilide.
10. A compound of claim 1: 3,4-dichloro-4'-(mixed)-pentylcarbanilide.

References Cited

UNITED STATES PATENTS

| | | | |
|---|---|---|---|
| 2,818,390 | 12/1957 | Beaver et al. | 260—553C |
| 2,745,874 | 5/1956 | Shetty et al. | 260—553C |

OTHER REFERENCES

Beaver et al., The Preparation and Bacteriostatic Activity of Substituted Ureas, J. Am. Chem. Soc., vol. 79, March 1957, pp. 1236–1245.

BERNARD HELFIN, Primary Examiner

M. W. GLYNN, Assistant Examiner

U.S. Cl. X.R.
424—322